United States Patent
Wiehl

(10) Patent No.: US 6,206,576 B1
(45) Date of Patent: Mar. 27, 2001

(54) CAGE FOR CYLINDRICAL ROLLING ELEMENTS

(75) Inventor: Hermann Wiehl, Herzogenaurach (DE)

(73) Assignee: INA Walzlanger Schaeffler oHG (DE)

( * ) Notice: Subject to any disclaimer, the term of this patent is extended or adjusted under 35 U.S.C. 154(b) by 0 days.

(21) Appl. No.: 09/261,296

(22) Filed: Mar. 2, 1999

(30) Foreign Application Priority Data

Mar. 20, 1998 (DE) ............................................... 198 12 252

(51) Int. Cl.⁷ ............................................... F16C 33/46
(52) U.S. Cl. ........................ 384/575; 384/572; 384/580
(58) Field of Search ................................. 384/572, 575, 384/580

(56) References Cited

U.S. PATENT DOCUMENTS

| | | | |
|---|---|---|---|
| 1,232,523 | * 9/1917 | Folk | 384/580 |
| 1,870,892 | * 8/1932 | Brown | 384/574 |
| 3,038,767 | * 6/1962 | Greby | 384/575 |
| 3,042,464 | * 7/1962 | Gothberg | 384/575 |
| 3,365,775 | * 1/1968 | Cavagnero | 384/575 X |
| 3,482,891 | * 12/1969 | Evangelista et al. | 384/575 |
| 4,522,516 | * 6/1985 | Neese | 384/572 |
| 5,391,005 | 2/1995 | Alling . | |
| 5,567,059 | * 10/1996 | Weigand et al. | 384/572 X |

FOREIGN PATENT DOCUMENTS

| | | |
|---|---|---|
| 376378 | 5/1923 | (DE) . |
| 1941894 | 7/1966 | (DE) . |
| 4444449 | 8/1995 | (DE) . |

* cited by examiner

*Primary Examiner*—Charles A Marmor
*Assistant Examiner*—Saúl Rodríguez
(74) *Attorney, Agent, or Firm*—Bierman, Muserlian and Lucas

(57) ABSTRACT

A profiled cage characterized in that, between crossbars (5) in peripheral direction, side rings (1, 2) comprise a slot (15) which is spaced from the ends of the pockets (6) so that a section of material (16) is formed which is retained by two adjacent crossbars (5) and which, in a radially inwards bent state, constitutes the convexity (13, 14) providing an improved contact between the end faces of the rolling elements (7) and the convexities (13, 14).

3 Claims, 2 Drawing Sheets

CAGE FOR CYLINDRICAL ROLLING ELEMENTS

FIELD OF THE INVENTION

A cage for cylindrical rolling elements, more particularly a needle roller cage, whose side rings are connected to each other by crossbars to form pockets, said crossbars being profiled to hold each rolling element on either side of a pitch circle by crossbar edges which are parallel to axes of the rolling elements, said side rings comprising inwardly directed convexities against which the rolling elements bear by end faces.

BACKGROUND OF THE INVENTION

A cage of this type described in U.S. Pat. No. 5,391,005 has an approximately M-shaped cross-sectional profile and comprises two side rings which are joined to each other by circumferentially equally spaced crossbars. The crossbars, which together with the side rings define pockets for the reception of the rolling elements, are divided into a number of sections, viz., two side sections, one center section and two inclined connecting sections, that is to say, they are bent inwards towards the center of the bearing to extend beyond the pitch circle. The outward and inward retention of the rolling elements is effected by the sections of the crossbars situated outside and inside the pitch circle, respectively.

In such needle roller cages, the length of the needle rollers and the width of the cage are matched to each other so that the needle rollers extend with their axial dimension almost from side ring to side ring to prevent the ends of the needle rollers from tilting out of the pockets. Under certain technical conditions, however, for example, in the case of large transition radii on stepped shafts, it can become necessary to equip such cages with shorter needle rollers because, otherwise, the needle rollers would come into rolling contact with the transition radii of the transition region of the shaft. But if such a cage is equipped with shorter needle rollers, these could eventually tilt over the crossbars and slip beneath the stamped retention elements and thus fall out of the pockets. In the state of the art, this is prevented by the fact that the end faces of the rolling elements bear against radially inwards directed convexities of the side rings.

A drawback of this cage is that the convexities permit only an insufficient contact of the end faces of the needle rollers. This is due to the fact that the convexities, because of their rigid connection to the side rings, do not comprise a plane-parallel contact surface, i. e. a surface contact is not possible between the convexity and the end face of the needle roller but, at the best, only a linear contact.

OBJECTS OF THE INVENTION

It is therefore an object of the invention to improve a generic bearing cage so that an improved contact between the convexity and end faces of the needle rollers is possible.

This and other objects and advantages of the invention will become obvious from the following detailed description.

SUMMARY OF THE INVENTION

The invention achieves the above objects by the fact that, between the crossbars in peripheral direction, the side rings comprise a slot which is spaced from the ends of the pockets so that a section of material is formed which is retained by two adjacent crossbars and which, in a radially inwards bent state, constitutes the convexity. Due to this modified connection of the convexity to the side ring, the convexity retains a plane-parallel contact surface even in the radially inwards bent state so that the bearing cage offers improved contact for the end faces of the needle rollers.

According to a further feature of the invention, the radial dimension of the slot is enlarged. By this is meant that an empty space is formed in the side rings between these and the convexities which permits an improved flow of lubricant through the bearing and thus decisively improves the friction behavior of the bearing.

According to a further proposition of the invention, the side rings comprise radially inwards directed flanges which improve the stability of the cage.

Finally, the novel manner of connecting the convexities can be used advantageously both in radial as well as in axial cages.

BRIEF DESCRIPTION OF THE DRAWINGS

The invention will now be described more closely with the help of the following example of embodiment illustrated in the drawings.

DETAILED DESCRIPTION OF THE DRAWINGS

Figure 4:
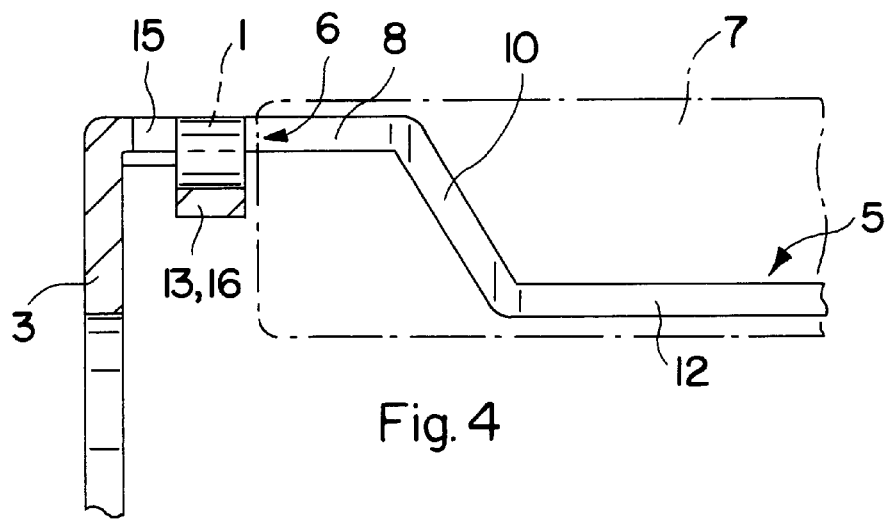
FIG. 4 is a partial longitudinal cross-section through a cage pocket of a cage of the invention.
Figure 5:
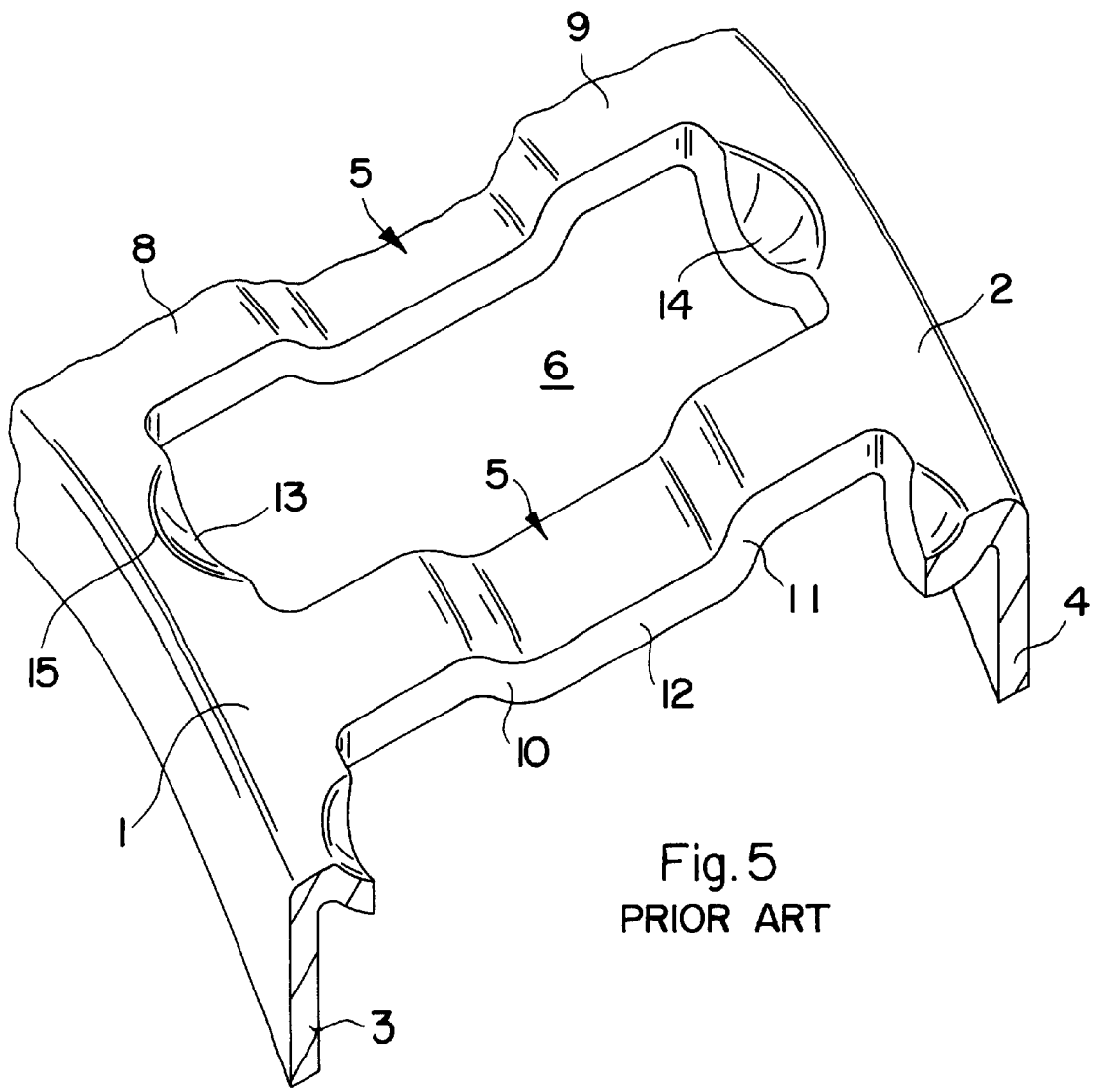
FIG. 5 is a partial perspective view of a cage of the prior art.

At first, the common features of the cage of the invention depicted in FIGS. 1 to 4 and the prior art cage shown in FIG. 5 will be dealt with. The cages of FIGS. 1 to 5 comprise two side rings, 1 and 2, which have flanges, 3 and 4, pointing towards the center of the bearing, said side rings 1, 2 being connected to each other by circumferentially equally spaced crossbars 5. The pockets 6 thus formed for the reception of rolling elements 7 are defined by the crossbars 5 and the side rings 1 and 2. The crossbars 5 are bent towards the center of the bearing so that they comprise two sections, 8 and 9, continuing from the side rings, 1 and 2, and extending parallel to the cage axis. The sections 8 and 9 are situated outside the pitch circle and merge into sections 10 and 11 respectively, which are inclined relative to the cage axis. The two inclined sections 10 and 11 merge into a central section 12 which is parallel to the cage axis and is situated inside the pitch circle. The edges of the crossbar sections 12 limit the radial play of the rolling elements 7 in inward direction, while, in outward direction, the radial play of the rolling elements 7 is limited by the crossbar sections 8 and 9. Both cages comprise convexities 13, 14 in the region of the pockets 6, which convexities 13, 14 point towards the center of the bearing and serve as contact surfaces for the end faces of the rolling elements 7.

As can be seen in FIG. 5, the convexities 13 and 14 made in the prior art cage by stamping are connected rigidly to the side rings 1 and 2. Due to the stamping process it is possible that the end faces of the convexities 13 and 14 are not plane-parallel to the flanges 3 and 4 so that there is an insufficient contact between the end faces of the rolling elements 7 and the convexities 13 and 14.

As shown in FIGS. 1 to 4, this problem is solved by the invention by the fact that the side rings 1 and 2 comprise, between the crossbars 5, a slot 15 which is spaced from the end faces of the pockets 6 and extends in peripheral direction from one crossbar 5 to the next crossbar 5. This results in the formation of a plurality of material sections 16 each of which is connected in peripheral direction to two adjacent crossbars 5. These material sections 16 are bent inwards towards the center of the bearing by a stamping process and thus form the convexities 13 and 14. Due to the reduced coherence of material of the material sections 16 as compared to the prior art, their inward radial displacement is simplified so that their end faces against which the end faces of the rolling elements 7 bear are parallel. This means that a surface contact is established between the convexities 13, 14 and the end faces of the rolling elements 7. Another advantage over the prior art is that the convexities 13 and 14 can be drawn considerably deeper towards the center of the bearing, that is to say, they extend at least up to the axis of rotation of the rolling elements 7. This reliably prevents the rolling elements 7 from falling out of the pockets 6.

Figure 1:
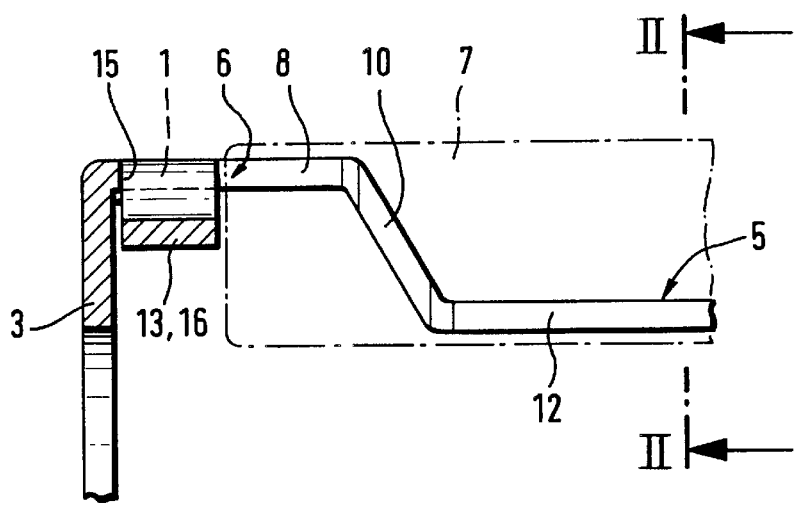
FIG. 1 is a partial longitudinal cross-section through a cage pocket of a cage of the invention.
Figure 2:
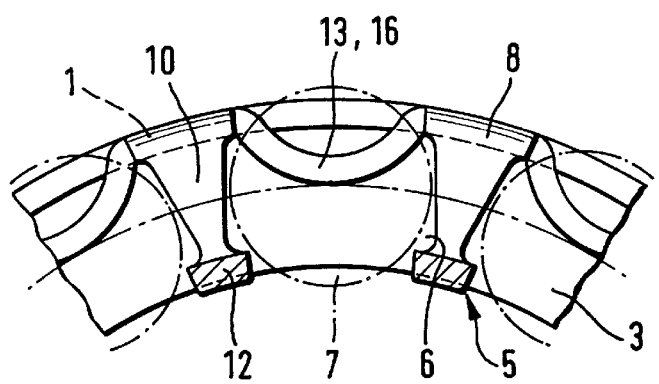
FIG. 2 is a cross-section taken along line II—II of FIG. 1.
Figure 3:
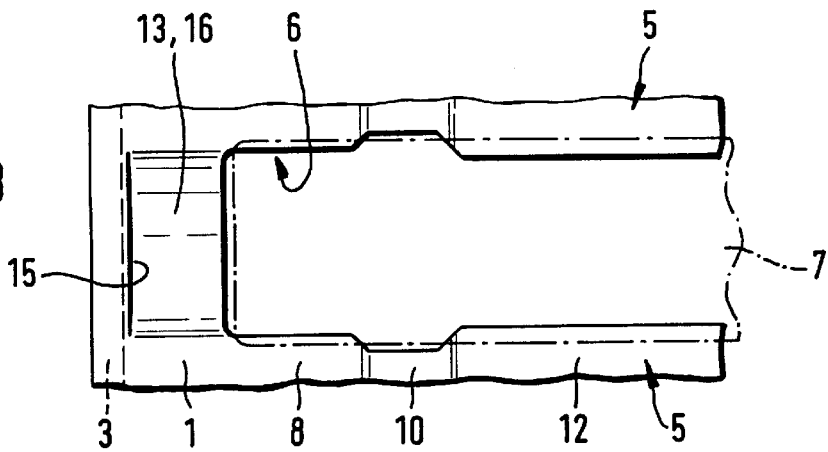
FIG. 3 is a partial top view of a cage of the invention.

The slot 15 in FIG. 4 is substantially wider than that shown in FIG. 1 i.e., it is configured as a kind of window so that, after re-shaping of the material sections 16 into the convexities 13 and 14, an empty space is formed between the convexities 13, 14 and the side rings 1 and 2 which facilitates the flow of lubricant through the bearing.

The invention is by no means restricted to the cylindrical rollers 7 of a radial bearing as described in the examples of embodiment but may also be used, for example, with barrel-shaped or conical rollers which may also be installed in an axial bearing.

What is claimed is:

1. A radial cage for cylindrical rolling elements comprising side rings connected to each other by crossbars to form pockets, said crossbars being profiled so as to hold each rolling element on either side of a pitch circle by crossbar edges which are parallel to axes of the rolling elements, said side rings having inwardly directed convexities against which the rolling elements bear by end faces, wherein between the crossbars in peripheral direction, the side rings comprise a slot spaced from ends of the pockets whereby a section of material is formed which is retained by two adjacent crossbars and which, in a radially inward bent state, constitutes the convexity.

2. A cage of claim 1 wherein a axial dimension of the slot is enlarged.

3. A cage of claim 1 wherein the side rings comprise radially inwards directed flanges.

* * * * *